(12) United States Patent
Chou et al.

(10) Patent No.: US 10,806,994 B2
(45) Date of Patent: Oct. 20, 2020

(54) TRIGGER WITH USER ADJUSTABLE SENSOR POSITION

(71) Applicant: Cheng Uei Precision Industry Co., Ltd., New Taipei (TW)

(72) Inventors: Hsieh Cheng Chou, New Taipei (TW); Chi Ming Tseng, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 16/371,169

(22) Filed: Apr. 1, 2019

(65) Prior Publication Data
US 2019/0329127 A1    Oct. 31, 2019

(30) Foreign Application Priority Data
Apr. 27, 2018    (TW) .............................. 107205567 U

(51) Int. Cl.
*A63F 13/24* (2014.01)
*A63F 13/22* (2014.01)

(52) U.S. Cl.
CPC .............. *A63F 13/24* (2014.09); *A63F 13/22* (2014.09)

(58) Field of Classification Search
CPC .. A63F 13/24; A63F 13/98; A63F 2300/1043; A63F 2250/488
See application file for complete search history.

(56) References Cited

U.S. PATENT DOCUMENTS

| | | | |
|---|---|---|---|
| 9,174,134 B1* | 11/2015 | Grant | A63F 13/98 |
| 2012/0322555 A1* | 12/2012 | Burgess | A63F 13/06 463/37 |
| 2016/0175705 A1* | 6/2016 | Venkatesan | G06F 3/016 463/37 |
| 2016/0193529 A1* | 7/2016 | Burgess | A63F 13/20 463/37 |
| 2016/0351362 A1* | 12/2016 | Tsai | A63F 13/22 |
| 2016/0361639 A1* | 12/2016 | Schmitz | A63F 13/218 |
| 2017/0001108 A1* | 1/2017 | Burgess | A63F 13/22 |
| 2017/0043247 A1* | 2/2017 | Hackney | A63F 13/24 |
| 2017/0157509 A1* | 6/2017 | Burgess | A63F 13/22 |
| 2018/0250587 A1* | 9/2018 | Strahle | A63F 13/25 |
| 2018/0345135 A1* | 12/2018 | Schmitz | G06F 3/016 |
| 2018/0345136 A1* | 12/2018 | Schmitz | F41A 19/10 |

* cited by examiner

*Primary Examiner* — Lawrence S Galka
(74) *Attorney, Agent, or Firm* — Lin & Associates Intellectual Property, Inc.

(57) ABSTRACT

A trigger with user adjustable sensor position assembled to an outer shell, includes a pressing portion pivotally connected to the outer shell, a torsion spring elastically abutting between the pressing portion and the outer shell, a triggering portion assembled in the outer shell, and an adjusting assembly. When an elastic force of the torsion spring is released, the torsion spring elastically abuts against the pressing portion to define a position where the pressing portion is located to be an original position, a position where the pressing portion abuts against the triggering portion to trigger the triggering portion is defined as a triggering position. The pressing portion is capable of swinging between the original position and the triggering position. The adjusting assembly is assembled in the outer shell. When the adjusting assembly is in different adjusting positions, key travels between the pressing portion and the triggering portion are different.

15 Claims, 14 Drawing Sheets

TRIGGER WITH USER ADJUSTABLE SENSOR POSITION

CROSS-REFERENCE TO RELATED APPLICATION

The present application is based on, and claims priority form, Taiwan Patent Application No. 107205567, filed Apr. 27, 2018, the disclosure of which is hereby incorporated by reference herein in its entirety.

BACKGROUND OF THE INVENTION

1. Field of the Invention

The present invention generally relates to trigger of a game controller, and more particularly to a trigger with user adjustable sensor position, and a game controller including the trigger with user adjustable sensor position of which key travels are capable of being adjusted.

2. The Related Art

Referring to FIG. 14, a conventional game controller 200' includes a conventional trigger 100'. The conventional trigger 100' includes a pressing key 10' and a triggering portion 20'. A user presses the pressing key 10' to make the pressing key 10' to push against the triggering portion 20' so as to execute corresponding operation instructions.

However, a key travel between the pressing key 10' and the triggering portion 20' is a single key travel, the key travel has no way of being adjusted, in a process of the user playing various games, the user will have different requirements on the key travel of the conventional trigger 100'.

Thus, in order to solve the problems described above, an innovative trigger with user adjustable sensor position, and an innovative game controller including the innovative trigger with user adjustable sensor position are essential to be provided, key travels of the innovative trigger with user adjustable sensor position are capable of being adjusted for satisfying different usage requirements of the user in the process of the user playing the various games.

SUMMARY OF THE INVENTION

An object of the present invention is to provide a trigger with user adjustable sensor position assembled to an outer shell of a game controller. The trigger with user adjustable sensor position includes a pressing portion pivotally connected to the outer shell and projecting beyond a surface of the outer shell, a torsion spring elastically abutting between the pressing portion and the outer shell, a triggering portion and an adjusting assembly. The triggering portion is assembled in the outer shell. The triggering portion and the pressing portion are disposed face to face. When an elastic force of the torsion spring is released, the torsion spring elastically abuts against the pressing portion to define a position where the pressing portion is located to be an original position, a position where the pressing portion abuts against the triggering portion to trigger the triggering portion is defined as a triggering position. The pressing portion is capable of swinging between the original position and the triggering position, when the pressing portion is located at the original position, the pressing portion is spaced from the triggering portion to form a key travel between the pressing portion and the triggering portion. The pressing portion is pressed rearward, the pressing portion swings from the original position to the triggering position, and the pressing portion abuts against the triggering portion to trigger the triggering portion. The adjusting assembly is assembled in the outer shell and connected with the triggering portion. The adjusting assembly has a plurality of adjusting positions, when the adjusting assembly is in different adjusting positions, key travels between the pressing portion and the triggering portion are different. The adjusting assembly includes a fastening portion, a sliding portion, an adjusting block and a returning assembly, the fastening portion is fastened to the outer shell, the sliding portion is slidably mounted to the fastening portion, the triggering portion is fastened to the sliding portion and is disposed opposite to the pressing portion, the adjusting block includes a main portion slidably assembled under the fastening portion, the main portion is slidably assembled with the sliding portion and is capable of transversely sliding to make the sliding portion slide frontward and rearward with respect to the pressing portion, the returning assembly is disposed to the sliding portion for returning the sliding portion, a rear surface of the sliding portion opposite to the pressing portion has an inclined adjusting surface, the adjusting surface defines a plurality of spaced locating slots corresponding to the plurality of the adjusting positions.

Another object of the present invention is to provide a game controller. The game controller includes an outer shell, a main board disposed in the outer shell, a pressing portion pivotally connected to the outer shell and projecting beyond a surface of the outer shell, a torsion spring elastically abutting between the pressing portion and the outer shell, a triggering portion and an adjusting assembly. The triggering portion is assembled in the outer shell. The triggering portion is electrically connected with the main board. The triggering portion and the pressing portion are disposed face to face. When an elastic force of the torsion spring is released, the torsion spring elastically abuts against the pressing portion to define a position where the pressing portion is located to be an original position, a position where the pressing portion abuts against the triggering portion to trigger the triggering portion is defined as a triggering position. The pressing portion is capable of swinging between the original position and the triggering position. When the pressing portion is located at the original position, the pressing portion is spaced from the triggering portion to form a key travel between the pressing portion and the triggering portion. The pressing portion is pressed rearward, the pressing portion swings from the original position to the triggering position, and the pressing portion abuts against the triggering portion to trigger the triggering portion. The adjusting assembly is assembled in the outer shell and connected with the triggering portion. The adjusting assembly has a plurality of adjusting positions. When the adjusting assembly is in different adjusting positions, key travels between the pressing portion and the triggering portion are different. The adjusting assembly has a vertical board extending along an up-down direction, a rear surface of the vertical board opposite to the pressing portion protrudes rearward to form a trapezoidal guiding block which has two inclined surfaces, and a plane connected between the two inclined surfaces, the two inclined surfaces and the plane are recessed inward to form an adjusting surface, two opposite ends of the adjusting surface connected with the vertical board open two first locating slots, the plane connected between the two inclined surfaces opens a second locating slot, the adjusting assembly includes an adjusting block which includes a main portion, a substantial middle of a front surface of the main portion of the adjusting block facing to the guiding block is recessed rearward to form a guiding groove, one side wall of the guiding groove protrudes frontward to form a protruding block facing to the adjusting surface, when the adjusting assembly is in one of the plurality of the adjusting positions, the guiding block is received in the guiding groove, the protruding block is received in one of the two first locating slots and the second locating slot corresponding to the protruding block.

Another object of the present invention is to provide a trigger with user adjustable sensor position assembled to an outer shell of a game controller. The trigger with user adjustable sensor position includes a pressing portion pivotally connected to the outer shell and projecting beyond a surface of the outer shell, a torsion spring assembled in the outer shell and elastically abutting the pressing portion, a triggering portion and an adjusting assembly. The triggering portion is assembled in the outer shell. The triggering portion and the pressing portion are disposed face to face. When an elastic force of the torsion spring is released, the torsion spring elastically abuts against the pressing portion to define a position where the pressing portion is located to be an original position, a position where the pressing portion abuts against the triggering portion to trigger the triggering portion is defined as a triggering position. The pressing portion is capable of swinging between the original position and the triggering position. When the pressing portion is located at the original position, the pressing portion is spaced from the triggering portion to form a key travel between the pressing portion and the triggering portion. The pressing portion is pressed rearward, the pressing portion swings from the original position to the triggering position, and the pressing portion abuts against the triggering portion to trigger the triggering portion. The adjusting assembly is assembled in the outer shell and connected with the triggering portion. The adjusting assembly includes a sliding portion, and an adjusting block which includes a main portion. A rear surface of the sliding portion opposite to the pressing portion has an adjusting surface. The main portion is disposed behind the adjusting surface. A front surface of the main portion protrudes frontward to form a protruding block. The adjusting surface defines a plurality of spaced locating slots corresponding to a plurality of adjusting positions. The main portion is slidably assembled with the sliding portion and is capable of transversely sliding to make the sliding portion slide frontward and rearward with respect to the pressing portion. The protruding block is alternately received in the plurality of the locating slots to make the adjusting assembly be in different adjusting positions. When the adjusting assembly is in the different adjusting positions, key travels between the pressing portion and the triggering portion being different.

As described above, the triggering portion is fastened to the sliding portion of the adjusting assembly, and the adjusting assembly has the plurality of the adjusting positions, when the adjusting assembly is in the different adjusting positions, the key travels between the pressing portion and the triggering portion of the trigger with user adjustable sensor position are different. As a result, the key travels of the trigger with user adjustable sensor position are capable of being adjusted for satisfying different usage requirements of a user in a process of the user playing various games.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
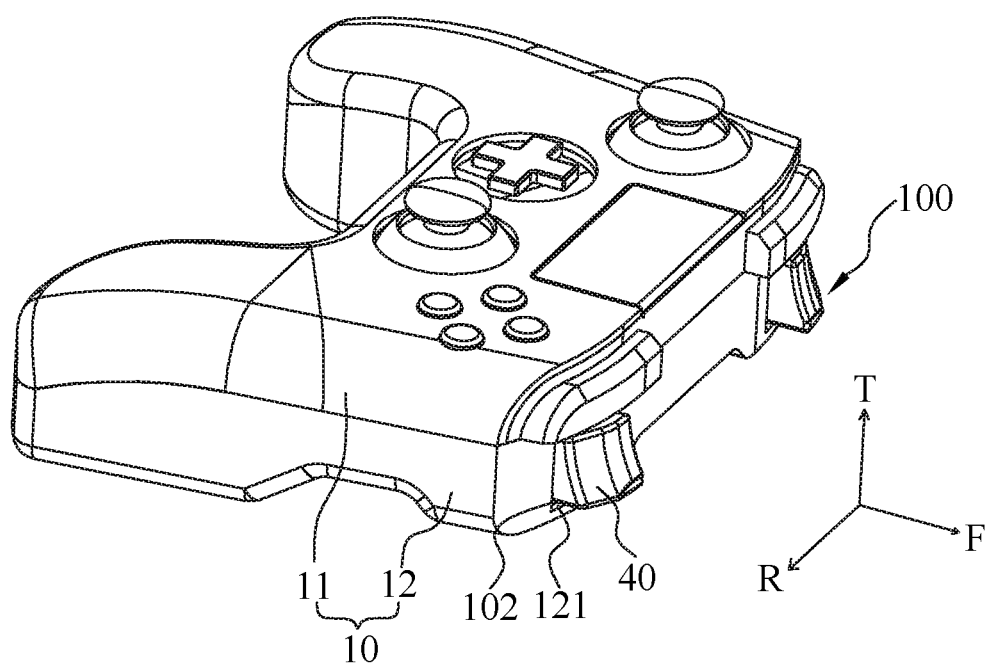
FIG. 1 is a perspective view of a game controller including a trigger with user adjustable sensor position in accordance with a preferred embodiment of the present invention.
Figure 2:
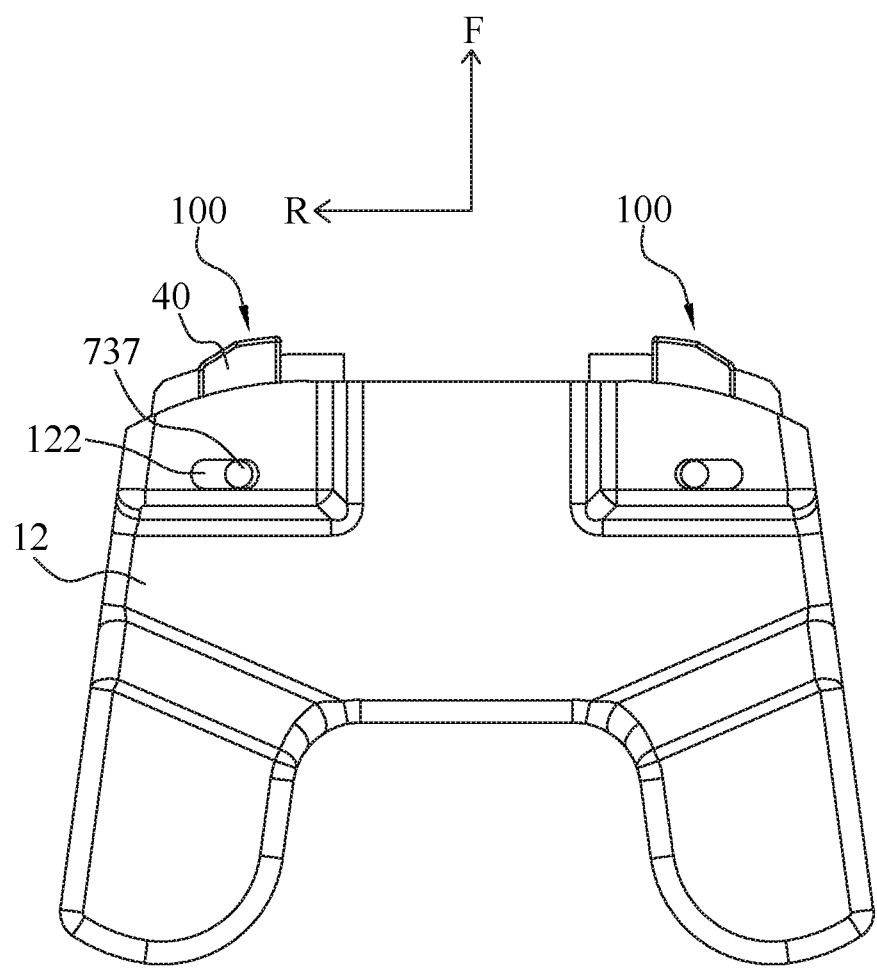
FIG. 2 is an upward view of the game controller including the trigger with user adjustable sensor position of FIG. 1.
Figure 3:
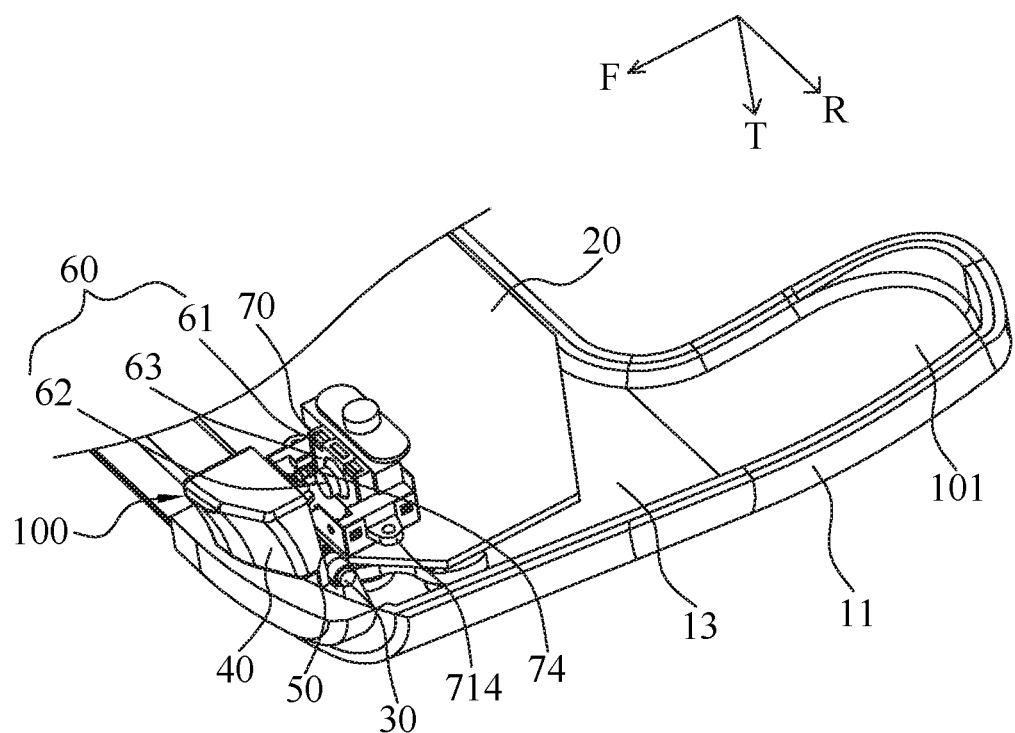
FIG. 3 is a partially perspective view showing the trigger with user adjustable sensor position and an upper cover of the game controller of FIG. 1.
Figure 4:
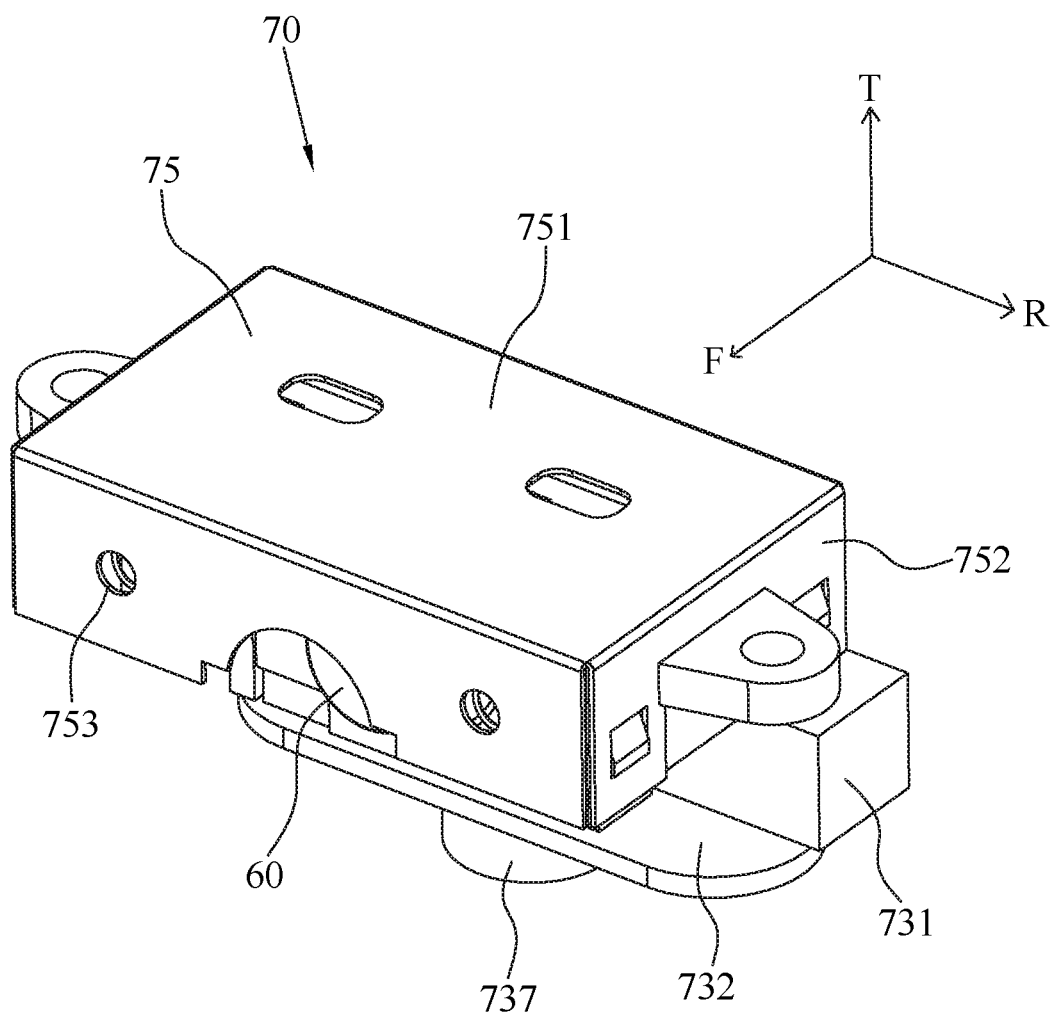
FIG. 4 is a perspective view showing that a triggering portion of the trigger with user adjustable sensor position is assembled to an adjusting portion of the trigger with user adjustable sensor position of the game controller of FIG. 1.
Figure 12:
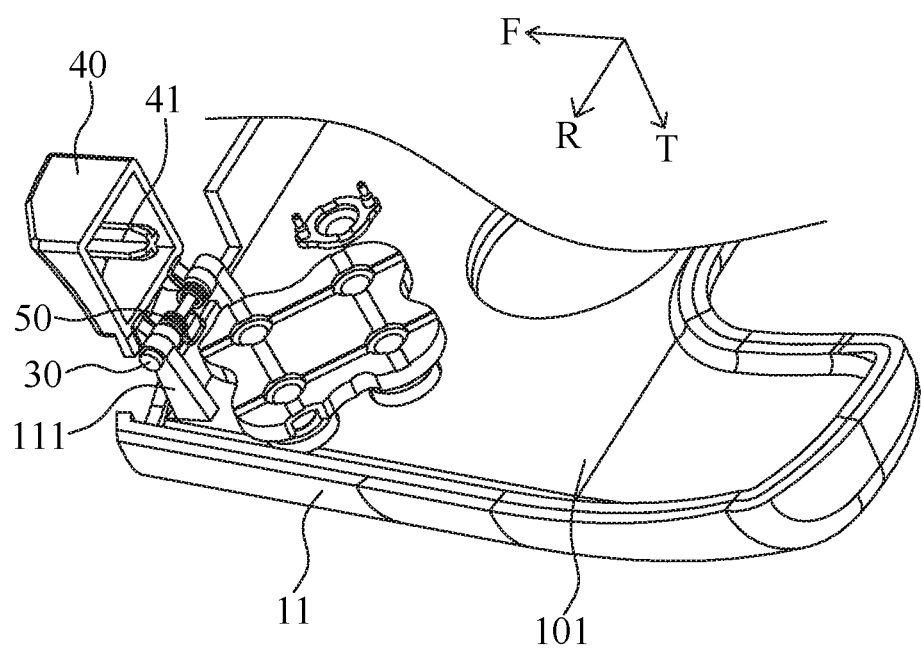
FIG. 12 is a perspective view showing that a pressing portion is assembled to the upper cover of the trigger with user adjustable sensor position in accordance with the present invention.
Figure 13:
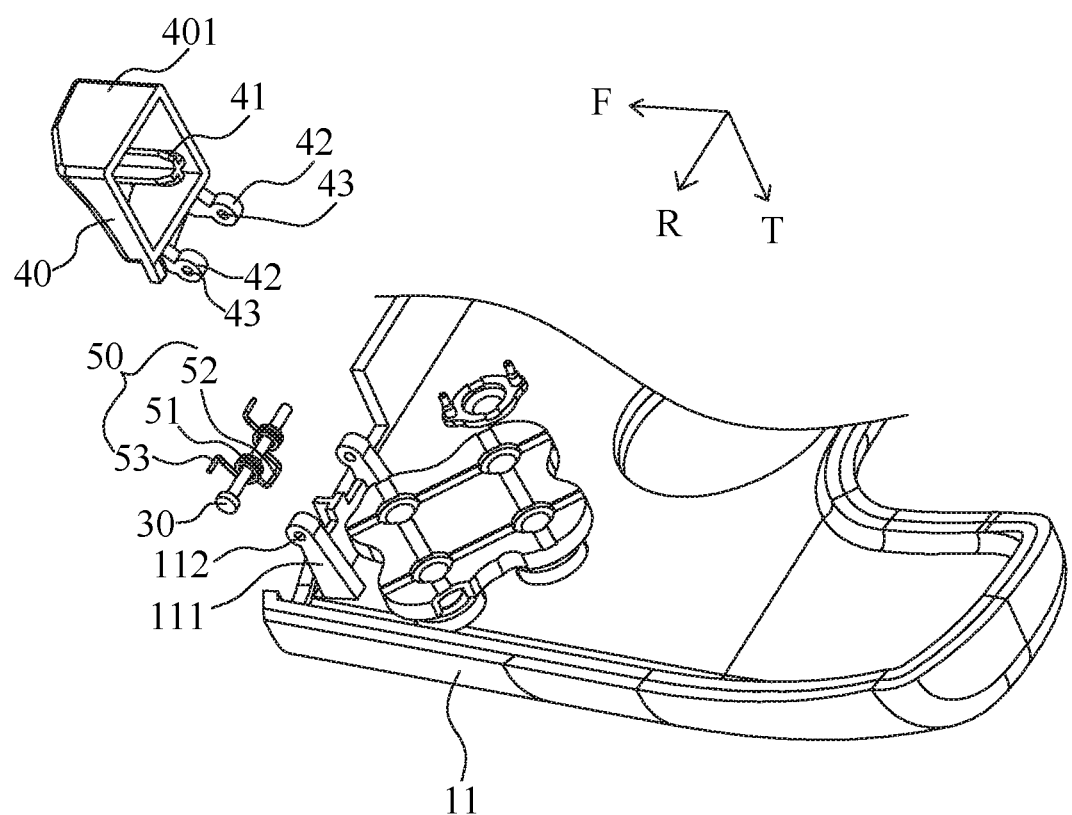
FIG. 13 is an exploded view showing the pressing portion and the upper cover of the trigger with user adjustable sensor position of FIG. 12.
Figure 14:
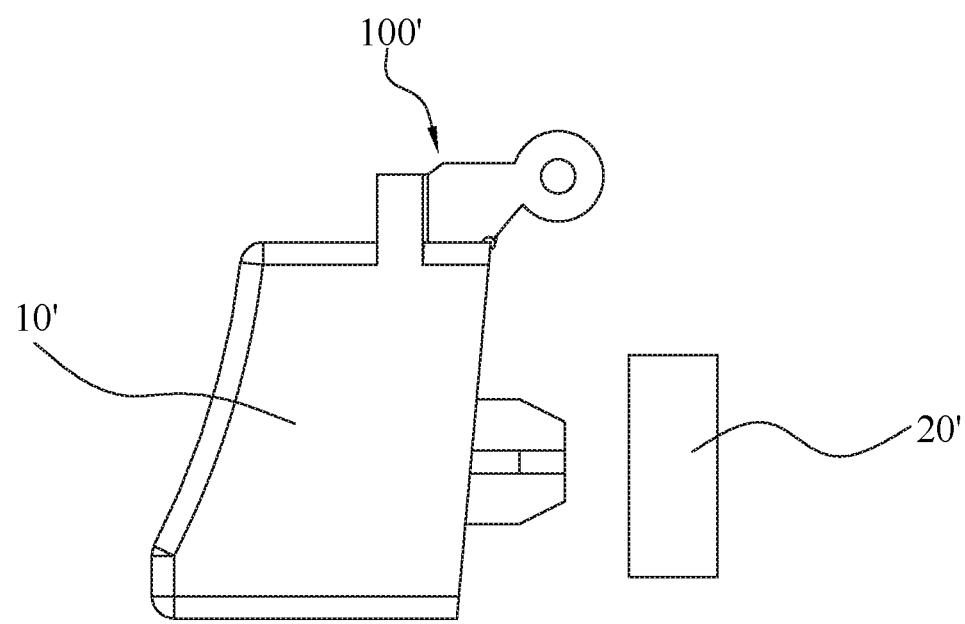
FIG. 14 is a schematic diagram of a conventional trigger with user adjustable sensor position in prior art.

With reference to FIG. 1, FIG. 3 and FIG. 12, a trigger with user adjustable sensor position 100 and a game controller 200 including the trigger with user adjustable sensor position 100 in accordance with a preferred embodiment of the present invention are shown. The trigger with user adjustable sensor position 100 is assembled to an outer shell 10 of the game controller 200, includes a main board 20, a pivoting pillar 30, a pressing portion 40, a torsion spring 50, a triggering portion 60 and an adjusting assembly 70. In the preferred embodiment, the trigger with user adjustable sensor position 100 includes two main boards 20, two pivoting pillars 30, two pressing portions 40, two torsion springs 50, two triggering portions 60 and two adjusting assemblies 70.

With reference to FIG. 1 to FIG. 13, a plurality of coordinate systems are shown in FIG. 1 to FIG. 13. A direction F of each coordinate system is defined as a frontward direction. A direction of each coordinate system opposite to the direction F is defined as a rearward direction. A direction T of each coordinate system is defined as an upward direction. A direction of each coordinate system opposite to the direction T is defined as a downward direction. A direction R of each coordinate system is defined as a rightward direction. A direction opposite to the direction R of each coordinate system is defined as a leftward direction.

With reference to FIG. 1, FIG. 2, FIG. 3, FIG. 12 and FIG. 13, the outer shell 10 includes an upper cover 11 and a lower cover 12 buckled with each other. A middle of a bottom of the upper cover 11 is opened freely to form a lower receiving space 101. A middle of a top of the lower cover 12 is opened freely to form an upper receiving space 102. When the upper cover 11 is buckled with the lower cover 12, the lower receiving space 101 is integrated with the upper receiving space 102 to form a receiving space 13 between the upper cover 11 and the lower cover 12. The main board 20 is disposed in the receiving space 13 of the outer shell 10. An inner bottom wall of the upper cover 11 protrudes downward to form a pivoting supporter 111. Two sides of the pivoting supporter 111 open two pivoting holes 112 transversely penetrating through the two sides of the pivoting supporter 111. In the preferred embodiment, two sides of the inner bottom wall of the upper cover 11 protrude downward to form two pivoting supporters 111. Two sides of each pivoting supporter 111 project beyond a bottom surface of a middle of the pivoting supporter 111.

The two sides of each pivoting supporter 111 open the two pivoting holes 112 transversely penetrating through the two sides of each pivoting supporter 111. The pivoting pillar 30 passes through and is fastened in the two pivoting holes 112 of each pivoting supporter 111. In the preferred embodiment, the trigger with user adjustable sensor position 100 includes two pivoting pillars 30. The two pivoting pillars 30 pass through the pivoting holes 112 of the two pivoting supporters 111, respectively. A front of the lower cover 12 opens a locating groove 121 communicated between the lower receiving space 101 and an outside. The locating groove 121 is corresponding to the pivoting supporter 111. In the preferred embodiment, two sides of the front of the lower cover 12 open two locating grooves 121 communicated between the lower receiving space 101 and the outside. The two locating grooves 121 are corresponding to the two pivoting supporters 111, respectively. A bottom wall of the lower cover 12 opens an adjusting hole 122 communicated between the lower receiving space 101 and the outside. Two sides of the bottom wall of the lower cover 12 open two adjusting holes 122 communicated between the lower receiving space 101 and the outside.

The pressing portion 40 is pivotally connected to the outer shell 10 and projects beyond a surface of the outer shell 10. The pressing portion 40 is pivotally connected to the pivoting pillar 30 and is received in the locating groove 121. The pressing portion 40 has a touching trough 401, and a mouth of the touching trough 401 faces rearward. A rear of the touching trough 401 protrudes rearward to form a pressing pillar 41. Two sides of a top of the touching trough 401 protrude upward to form two pivoting portions 42. The two pivoting portions 42 open two penetrating holes 43 transversely penetrating through the two pivoting portions 42. In the preferred embodiment, the pressing portion 40 is pivotally connected to the outer shell 10 and projects beyond a front surface of the outer shell 10. The pivoting pillar 30 passes through the two penetrating holes 43 of the pressing portion 40 and the two pivoting holes 112 of the pivoting supporter 111. The trigger with user adjustable sensor position 100 includes two pressing portions 40. The two pressing portions 40 are pivotally connected to the two pivoting pillars 30 and are received in the two locating grooves 121, respectively. The torsion spring 50 is assembled in the outer shell 10 and elastically abuts the pressing portion 40. The torsion spring 50 has a spring body 51, a first spring foot 52 and a second spring foot 53. The spring body 51 of the torsion spring 50 is pivotally connected to the pivoting pillar 30. The two pivoting portions 42 are located between the two sides of the pivoting supporter 111. The torsion spring 50 is located between the two pivoting portions 42. The first spring foot 52 elastically abuts against the pivoting supporter 111. The second spring foot 53 elastically abuts against the pressing portion 40. So the torsion spring 50 elastically abuts between the pressing portion 40 and the outer shell 10.

Figure 5:
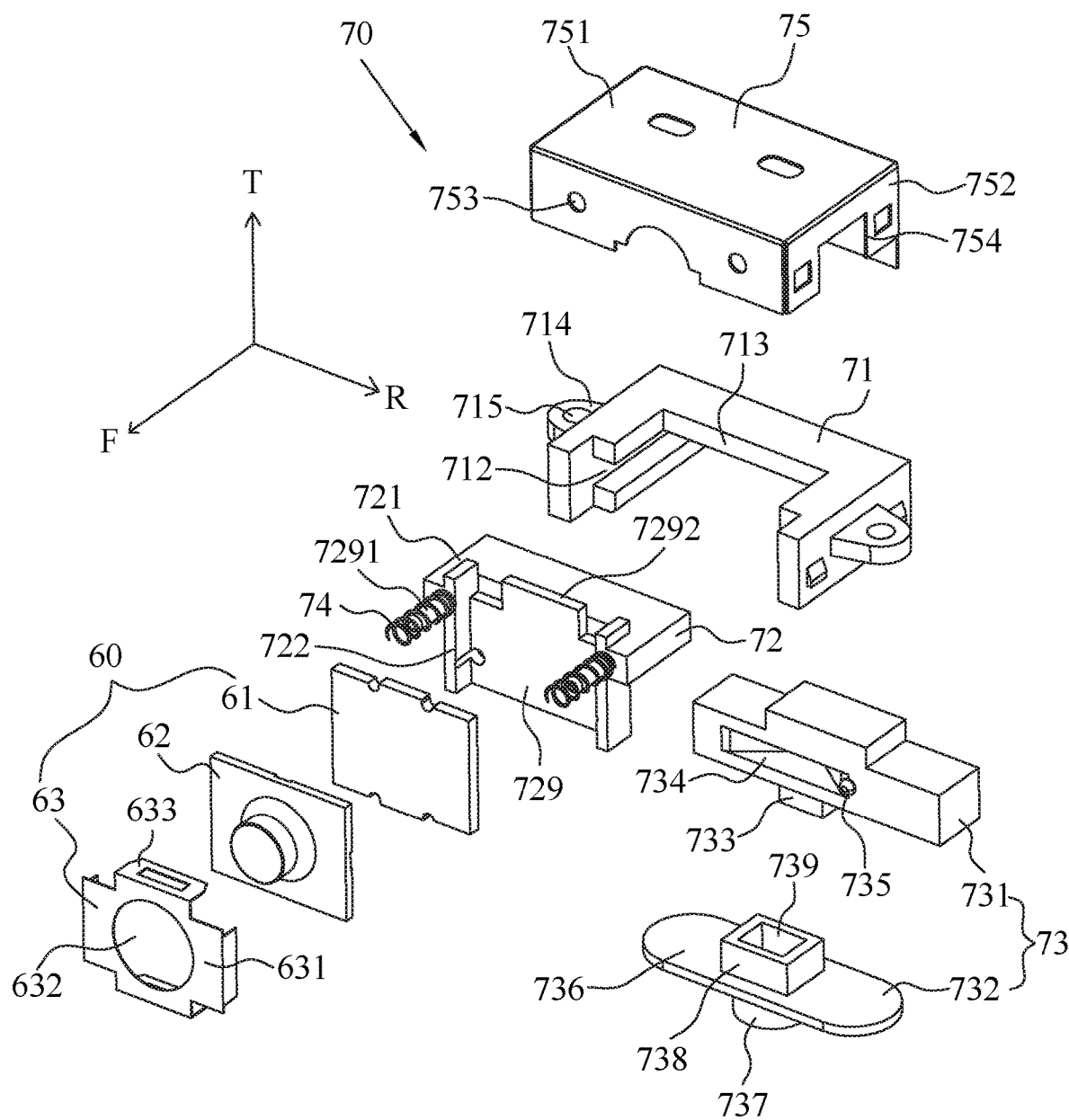
FIG. 5 is a partially exploded perspective view showing the triggering portion and the adjusting portion of the trigger with user adjustable sensor position of FIG. 4.
Figure 6:
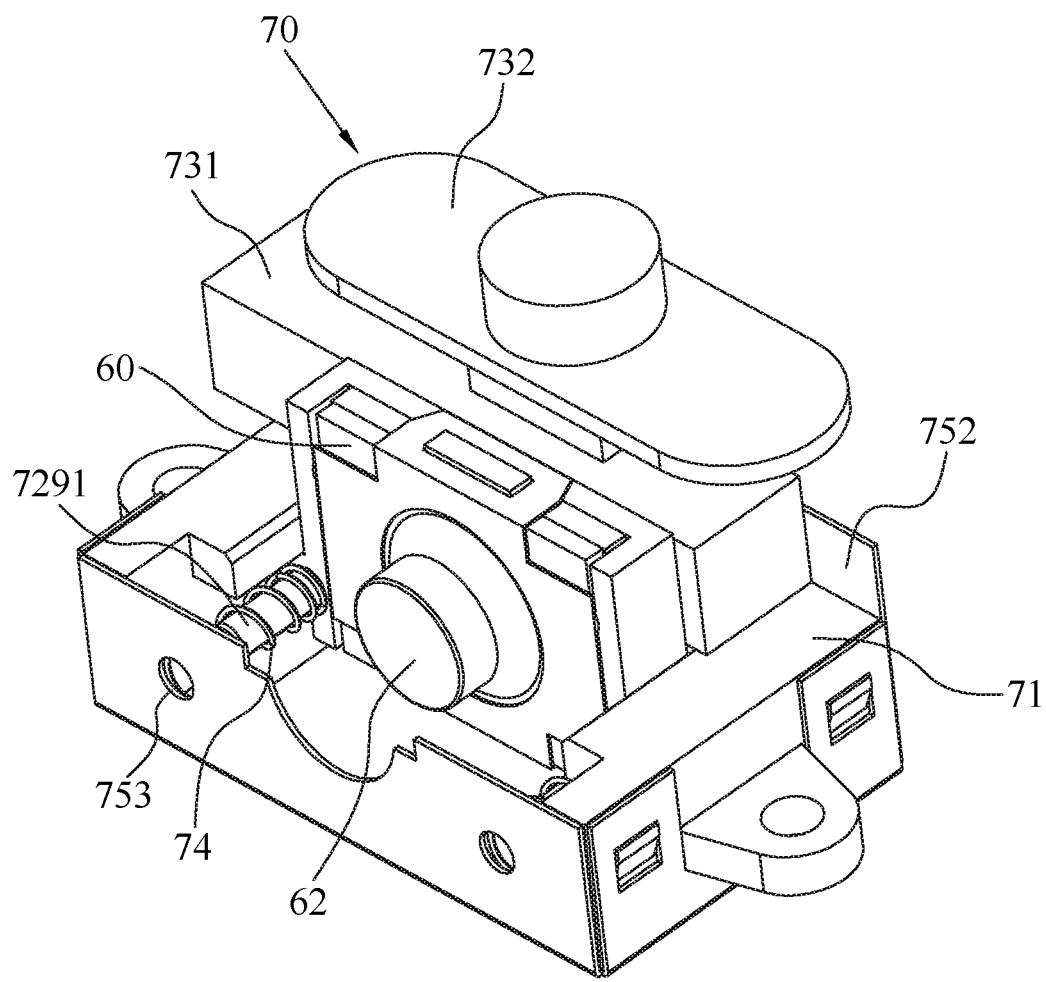
FIG. 6 is another perspective view showing that the triggering portion of the trigger with user adjustable sensor position is assembled to the adjusting portion of the trigger with user adjustable sensor position of FIG. 4.
Figure 7:
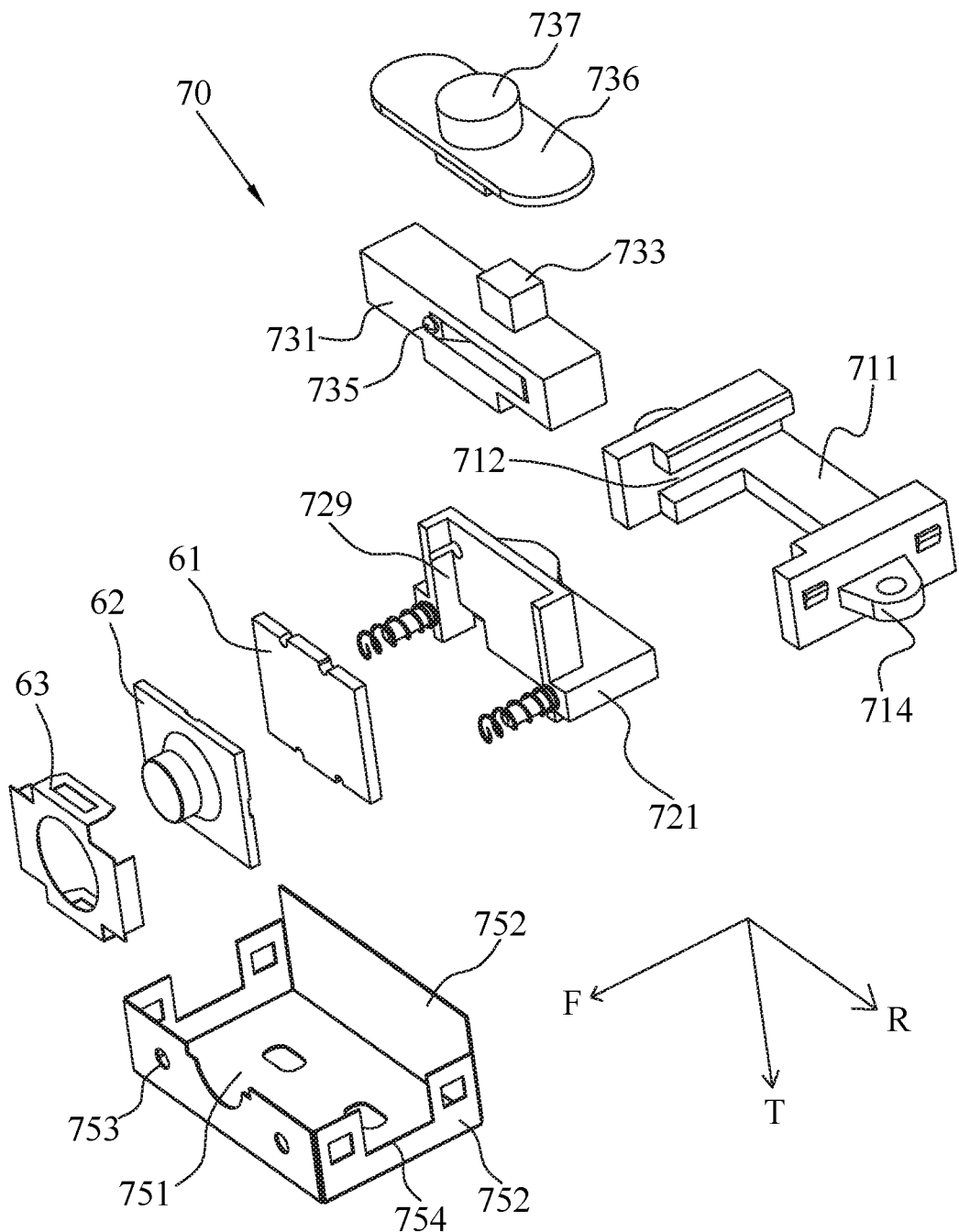
FIG. 7 is another partially exploded perspective view showing the triggering portion and the adjusting portion of the trigger with user adjustable sensor position of FIG. 4.
Figure 8:
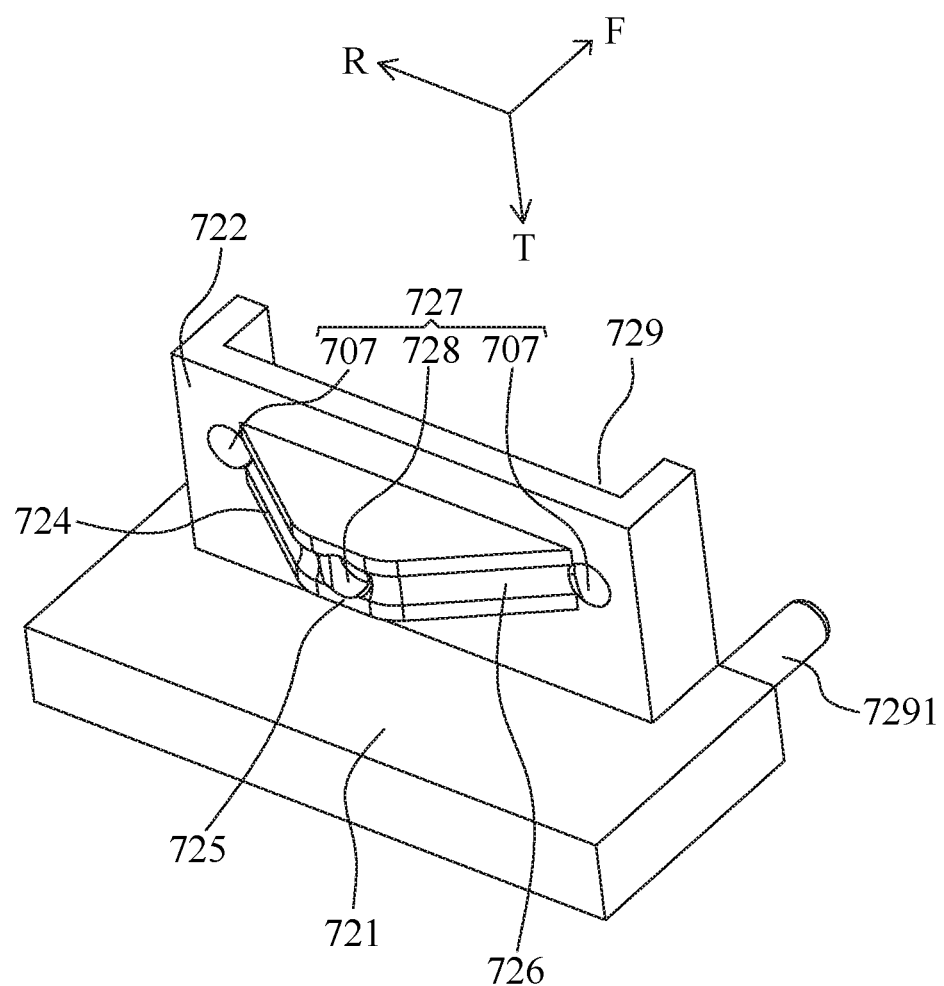
FIG. 8 is an exploded view showing a sliding portion of the adjusting portion of the game controller of FIG. 4.
Figure 9:
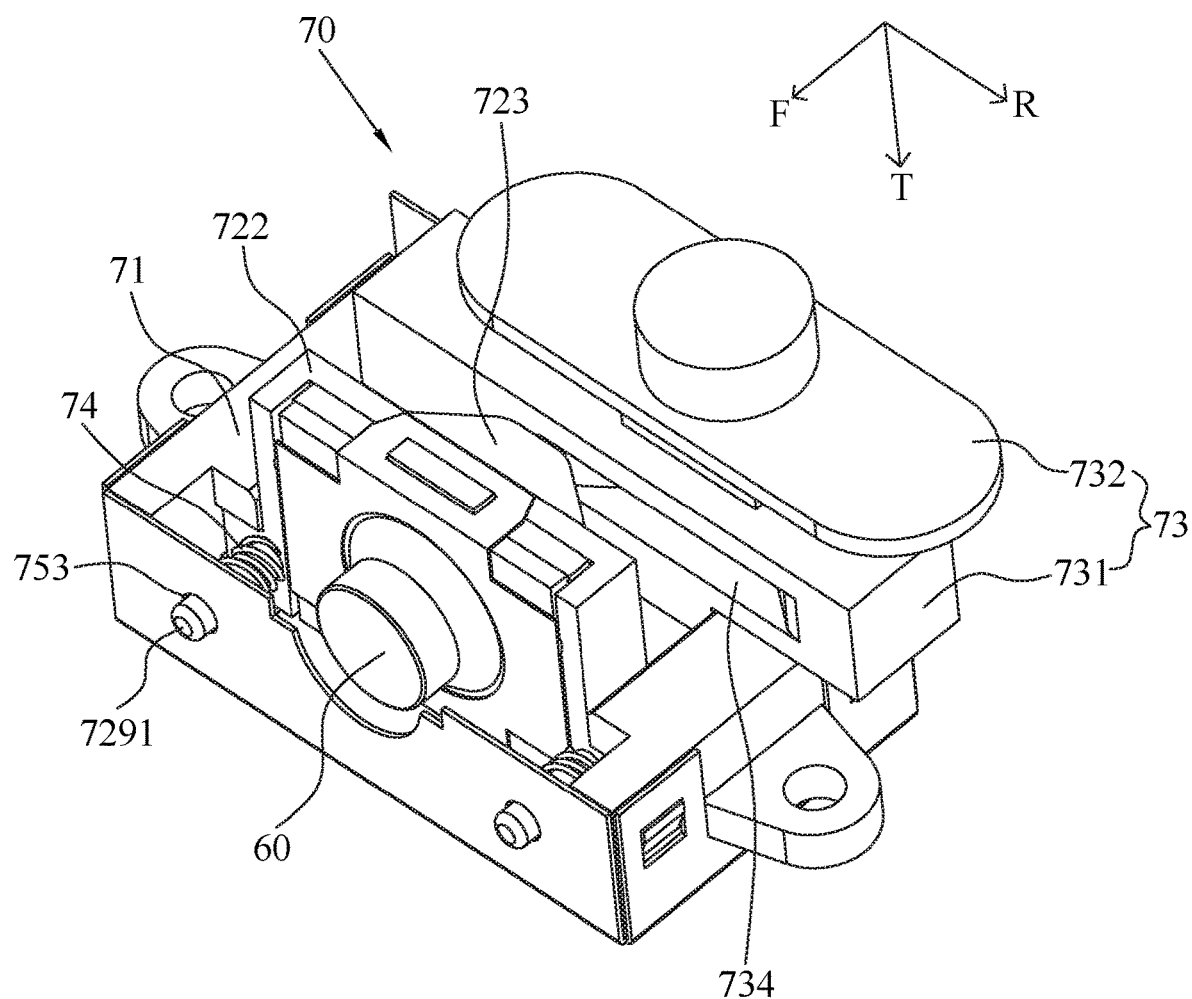
FIG. 9 is a status view showing that the adjusting portion is adjusted to a short key travel of FIG. 4.
Figure 10:
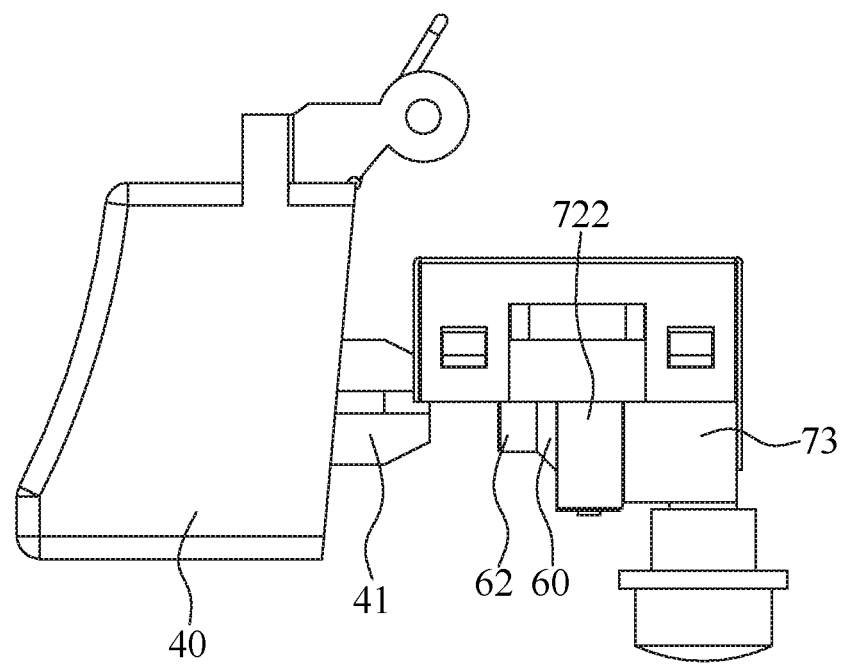
FIG. 10 is a status view showing that the triggering portion is adjusted to a long key travel of FIG. 4.
Figure 11:
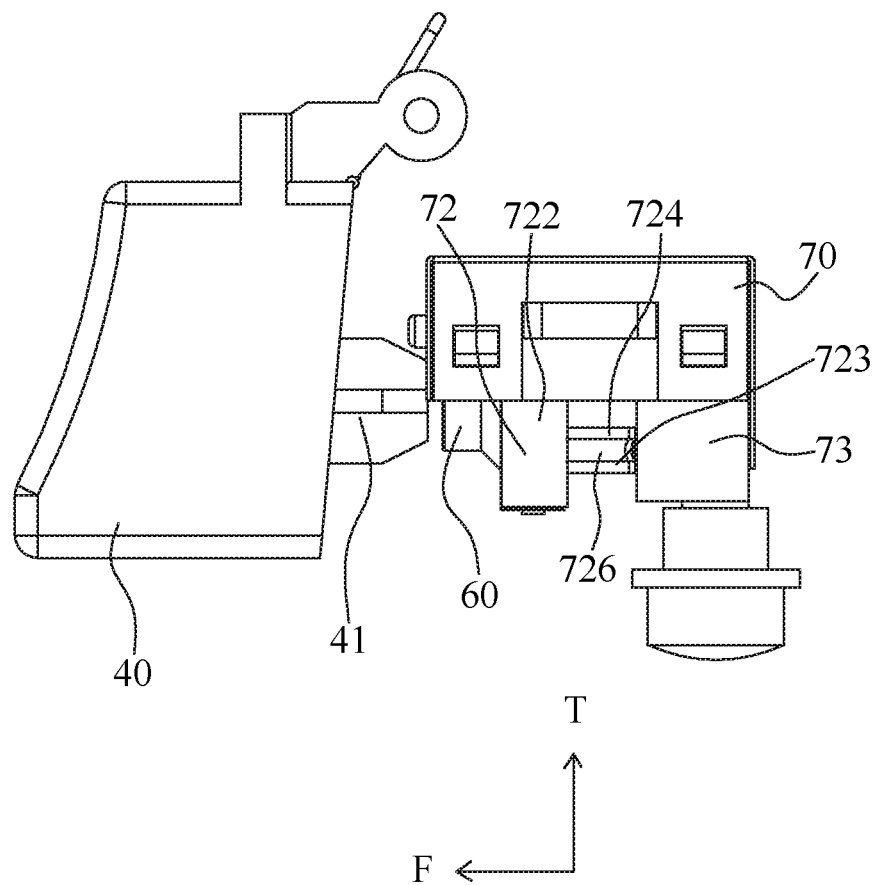
FIG. 11 is a status view showing that the triggering portion is adjusted to the short key travel of FIG. 4.

Referring to FIG. 1, FIG. 3 and FIG. 5, the triggering portion 60 is assembled in the outer shell 10. The triggering portion 60 and the pressing portion 40 are disposed face to face. The triggering portion 60 includes a circuit board 61, a conductive glue button 62 and a fastening element 63. The circuit board 61 of the triggering portion 60 is electrically connected with the main board 20. The conductive glue button 62 is disposed to a surface of the circuit board 61 facing to the pressing portion 40, namely the conductive glue button 62 is disposed to a front surface of the circuit board 61. The fastening element 63 has a rectangular base board 631. A middle of the base board 631 opens a circular opening 632. Four edges of the base board 631 are bent rearward to form four side boards 633. The fastening element 63 is used for fastening the conductive glue button 62 to the circuit board 61. In the preferred embodiment, the base board 631 is disposed to a front surface of the conductive glue button 62. A middle of the conductive glue button 62 is exposed outside from the circular opening 632. The four side boards 633 are fastened to side walls of the circuit board 61 corresponding to the four side boards 633.

With reference to FIG. 1 to FIG. 13, when an elastic force of the second spring foot 53 of the torsion spring 50 is released, the second spring foot 53 of the torsion spring 50 elastically abuts against the pressing portion 40 to define a position where the pressing portion 40 is located to be an original position. When the pressing portion 40 is located at the original position, the pressing portion 40 is spaced from the triggering portion 60 to form a key travel between the pressing portion 40 and the triggering portion 60. The key travel between the pressing portion 40 and the triggering portion 60 is a preset key travel of the trigger with user adjustable sensor position 100. A position where the pressing pillar 41 of the pressing portion 40 abuts against the triggering portion 60 to trigger a circuit of the circuit board 61 of the triggering portion 60 is defined as a triggering position. The pressing portion 40 is capable of swinging between the original position and the triggering position. The pressing portion 40 is pressed rearward, the pressing portion 40 swings from the original position to the triggering position, and the pressing portion 40 abuts against the triggering portion 60 to trigger the triggering portion 60, so that corresponding operation commands are capable of being executed. In the preferred embodiment, the pressing pillar 41 of the pressing portion 40 abuts against the conductive glue button 62 so as to trigger the circuit of the circuit board 61.

The adjusting assembly 70 is assembled in the receiving space 13 of the outer shell 10 and is connected with the triggering portion 60. The adjusting assembly 70 has a plurality of adjusting positions. When the adjusting assembly 70 is in different adjusting positions, key travels between the pressing portion 40 and the triggering portion 60 of the trigger with user adjustable sensor position 100 are different. In the preferred embodiment, the adjusting assembly 70 includes a fastening portion 71, a sliding portion 72, an adjusting block 73, a returning assembly 74 and a covering portion 75. A middle of a bottom of the fastening portion 71 is recessed upward to form a receiving groove 711. Two facing inner surfaces of two side walls of the receiving groove 711 are recessed oppositely to form two sliding slots 712. A front of a top of the fastening portion 71 is recessed downward to form a limiting groove 713 penetrating through a front surface of the fastening portion 71 and communicated with the receiving groove 711. Two opposite side surfaces of the fastening portion 71 protrude outward to form two assembling portions 714. The two assembling portions 714 open two assembling holes 715, respectively. The fastening portion 71 of the adjusting assembly 70 is fastened to the lower cover 12 of the outer shell 10 by virtue of the two assembling holes 715.

Referring to FIG. 2 to FIG. 9, the sliding portion 72 is slidably mounted to the fastening portion 71 and is capable of sliding frontward and rearward with respect to the pressing portion 40. In the preferred embodiment, the sliding portion 72 of the adjusting assembly 70 has a mounting board 721 assembled in the receiving groove 711, and a vertical board 722 extending along an up-down direction and intersecting with a front of the mounting board 721. Two sides of the mounting board 721 are assembled in the two sliding slots 712. The triggering portion 60 is fastened to the sliding portion 72 of the adjusting assembly 70 and is disposed opposite to the pressing portion 40. A rear surface of the sliding portion 72 opposite to the pressing portion 40 has an inclined adjusting surface 726. The adjusting surface 726 defines a plurality of spaced locating slots 727 corresponding to the plurality of the adjusting positions. In the preferred embodiment, the adjusting surface 726 is disposed to a surface of the vertical board 722 opposite to the pressing portion 40. The adjusting surface 726 is disposed to a rear surface of the vertical board 722 opposite to the pressing portion 40.

Specifically, the rear surface of the vertical board 722 opposite to the pressing portion 40 protrudes rearward to form a trapezoidal guiding block 723. The guiding block 723 has two inclined surfaces 724, and a plane 725 connected between the two inclined surfaces 724. The two inclined surfaces 724 and the plane 725 are recessed inward to form the adjusting surface 726. The plurality of the locating slots 727 include two first locating slots 707 and a second locating slot 728. Two opposite ends of the adjusting surface 726 connected with the vertical board 722 open the two first locating slots 707. The plane 725 connected between the two inclined surfaces 724 opens the second locating slot 728. A front surface of the vertical board 722 facing to the pressing portion 40 opens a fastening groove 729 recessed rearward. The triggering portion 60 is fastened in the fastening groove 729. Two sides of a surface of the mounting board 721 facing to the pressing portion 40 protrude frontward to form two guiding pillars 7291. A top surface of the mounting board 721 protrudes upward to form a limiting block 7292. The limiting block 7292 is limited in the limiting groove 713.

The adjusting block 73 includes a main portion 731 and an adjusting cap 732. The main portion 731 is slidably assembled under the fastening portion 71 and is capable of transversely sliding leftward and rightward. The main portion 731 is slidably assembled with the sliding portion 72 and is capable of transversely sliding to make the sliding portion 72 slide frontward and rearward with respect to the pressing portion 40. The main portion 731 is disposed behind the adjusting surface 726. A bottom surface of the main portion 731 protrudes downward to form an adjusting button 733. A substantial middle of a front surface of the main portion 731 of the adjusting block 73 facing to the guiding block 723 is recessed rearward to form a guiding groove 734. The front surface of the main portion 731 protrudes frontward to form a protruding block 735. One side wall of the guiding groove 734 of the main portion 731 protrudes frontward to form the protruding block 735 facing to the adjusting surface 726. When the adjusting assembly 70 is in one of the plurality of the adjusting positions, the guiding block 723 is received in the guiding groove 734. The protruding block 735 is alternately received in the plurality of the locating slots 727 corresponding to the protruding block 735 to make the adjusting assembly 70 be in the different adjusting positions. The protruding block 735 is received in one of the plurality of the locating slots 727 corresponding to the protruding block 735. The protruding block 735 is received in one of the two first locating slots 707 and the second locating slot 728 corresponding to the protruding block 735.

In the preferred embodiment, the protruding block 735 is protruded frontward from a right side wall of the guiding groove 734 and is received in a right-hand first locating slot 707. The adjusting cap 732 has an adjusting board 736. A middle of a bottom surface of the adjusting board 736 protrudes downward to form an adjusting portion 737. A top surface of the adjusting board 736 protrudes upward to form a buckling block 738 corresponding to the adjusting portion 737. A middle of a top surface of the buckling block 738 is recessed downward to form a buckling groove 739. The adjusting board 736 is disposed to a bottom of the main portion 731. The adjusting portion 737 is disposed to a bottom of the adjusting block 73. The adjusting button 733 is buckled in the buckling groove 739. The adjusting portion 737 is received in the adjusting hole 122 and is exposed out of the outer shell 10. In the preferred embodiment, the trigger with user adjustable sensor position 100 includes two adjusting assemblies 70. The adjusting portions 737 of the two adjusting assemblies 70 are received in the two adjusting holes 122 and are exposed out of the outer shell 10.

The covering portion 75 is formed by an upper cover board 751, and four lateral boards 752 surrounded around the upper cover board 751. The covering portion 75 is covered outside the fastening portion 71, the sliding portion 72, the adjusting block 73 and the returning assembly 74. In the preferred embodiment, the upper cover board 751 is disposed on an upper surface of the fastening portion 71. The four lateral boards 752 surround four lateral surfaces of the fastening portion 71, respectively. One of the four lateral boards 752 covering a rear surface of the fastening portion 71 projects beyond top surfaces of the other three lateral boards 752. The one of the four lateral boards 752 covering the rear surface of the fastening portion 71 is capable of cooperating with the adjusting surface 726 so as to limit a movement direction of the adjusting block 73 to make the adjusting block 73 just be able to transversely move leftward and rightward. The returning assembly 74 is disposed to the sliding portion 72 for returning the sliding portion 72. In the preferred embodiment, the returning assembly 74 includes two compression springs. The returning assembly 74 is worn around the two guiding pillars 7291. The two compression springs are worn around the two guiding pillars 7291, respectively. The returning assembly 74 elastically abuts between the mounting board 721 and one lateral board 752 of the covering portion 75 facing to the returning assembly 74. One end of each compression spring elastically abuts against the mounting board 721. The other end of each compression spring elastically abuts against the one lateral board 752 of the covering portion 75 facing to the two compression springs. Two sides of the one lateral board 752 facing to the returning assembly 74 which is the two compression springs and abutted by the two compression springs open two guiding holes 753 corresponding to the two guiding pillars 7291. Two lateral boards 752 corresponding to the two assembling portions 714 open two lacking grooves 754, respectively. The two assembling portions 714 project out of the covering portion 75 from the two lacking grooves 754.

Referring to FIG. 3 to FIG. 14, an adjusting process of the preset key travel of the trigger with user adjustable sensor position 100 in accordance with the preferred embodiment of the present invention is described as follows. When a long key travel is formed between a tail end of the pressing pillar 41 of the pressing portion 40 and the conductive glue button 62 of the triggering portion 60, the adjusting portion 737 is disposed to a left side of the adjusting hole 122. The guiding block 723 is received in the guiding groove 734. The protruding block 735 is blocked in a right-hand first locating slot 707. The returning assembly 74 which is the two compression springs elastically abut against the mounting board 721 to make the limiting block 7292 abut against a rear wall of the limiting groove 713.

When a user need use a shorter key travel, the adjusting portion 737 is pulled to move rightward to drive the adjusting block 73 to move rightward, so that the protruding block 735 slides along the adjusting surface 726 until the protruding block 735 is blocked in the second locating slot 728. The protruding block 735 pushes against the sliding portion 72 to move towards the pressing portion 40, namely the protruding block 735 pushes against the sliding portion 72 to move frontward, the two guiding pillars 7291 are inserted into the two guiding holes 753. The mounting board 721 abuts against the returning assembly 74 which is the two compression springs to make the returning assembly 74 which is the two compression springs compressed between the mounting board 721 and the one lateral board 752 of the covering portion 75 facing to the returning assembly 74 which is the two compression springs, and accumulate elastic forces, at the moment, the shorter key travel is formed between the tail end of the pressing pillar 41 of the pressing portion 40 and the conductive glue button 62. When the adjusting portion 737 is pulled to make the pressing pillar 41 and the conductive glue button 62 return to a status of the long key travel, the sliding portion 72 is pushed to return to the original position by virtue of the elastic forces of the returning assembly 74 which is the two compression springs.

As described above, the triggering portion 60 is fastened to the sliding portion 72 of the adjusting assembly 70, and the adjusting assembly 70 has the plurality of the adjusting positions, when the adjusting assembly 70 is in the different adjusting positions, the key travels between the pressing portion 40 and the triggering portion 60 of the trigger with user adjustable sensor position 100 are different. As a result, the key travels of the trigger with user adjustable sensor position 100 are capable of being adjusted for satisfying different usage requirements of the user in a process of the user playing various games.

What is claimed is:

1. A trigger with user adjustable sensor position assembled to an outer shell of a game controller, comprising:
   a pressing portion pivotally connected to the outer shell and projecting beyond a surface of the outer shell;
   a torsion spring elastically abutting between the pressing portion and the outer shell;
   a triggering portion assembled in the outer shell, the triggering portion and the pressing portion being disposed face to face, when an elastic force of the torsion spring is released, the torsion spring elastically abutting against the pressing portion to define a position where the pressing portion is located to be an original position, a position where the pressing portion abuts against the triggering portion to trigger the triggering portion being defined as a triggering position, the pressing portion being capable of swinging between the original position and the triggering position, when the pressing portion is located at the original position, the pressing portion being spaced from the triggering portion to form a key travel between the pressing portion and the triggering portion, the pressing portion being pressed rearward, the pressing portion swinging from the original position to the triggering position, and the pressing portion abutting against the triggering portion to trigger the triggering portion; and
   an adjusting assembly assembled in the outer shell and connected with the triggering portion, the adjusting assembly having a plurality of adjusting positions, when the adjusting assembly is in different adjusting positions, key travels between the pressing portion and the triggering portion being different;
   wherein the adjusting assembly includes a fastening portion, a sliding portion, an adjusting block and a returning assembly, the fastening portion is fastened to the outer shell, the sliding portion is slidably mounted to the fastening portion, the triggering portion is fastened to the sliding portion and is disposed opposite to the pressing portion, the adjusting block includes a main portion slidably assembled under the fastening portion, the main portion is slidably assembled with the sliding portion and is capable of transversely sliding to make the sliding portion slide frontward and rearward with respect to the pressing portion, the returning assembly is disposed to the sliding portion for returning the sliding portion, a rear surface of the sliding portion opposite to the pressing portion has an inclined adjusting surface, and the adjusting surface defines a plurality of spaced locating slots corresponding to the plurality of the adjusting positions.

2. The trigger with user adjustable sensor position as claimed in claim 1, further comprising a main board disposed in the outer shell, the triggering portion including a circuit board and a conductive glue button, the circuit board being electrically connected with the main board, the conductive glue button being disposed to a surface of the circuit board facing to the pressing portion, the pressing portion abutting against the conductive glue button so as to trigger a circuit of the circuit board.

3. The trigger with user adjustable sensor position as claimed in claim 2, wherein the triggering portion further includes a fastening element for fastening the conductive glue button to the circuit board.

4. The trigger with user adjustable sensor position as claimed in claim 1, wherein a front surface of the main portion protrudes frontward to form a protruding block facing to the adjusting surface, when the adjusting assembly is in one of the plurality of the adjusting positions, the protruding block is received in one of the plurality of the locating slots corresponding to the protruding block.

5. The trigger with user adjustable sensor position as claimed in claim 1, wherein a middle of a bottom of the fastening portion is recessed upward to form a receiving groove, two facing inner surfaces of two side walls of the receiving groove are recessed oppositely to form two sliding slots, the sliding portion has a mounting board assembled in the receiving groove, and a vertical board intersecting with a front of the mounting board, two sides of the mounting board are assembled in the two sliding slots, the adjusting surface is disposed to a surface of the vertical board opposite to the pressing portion, a front surface of the vertical board facing to the pressing portion opens a fastening groove recessed rearward, the triggering portion is fastened in the fastening groove.

6. The trigger with user adjustable sensor position as claimed in claim 5, wherein a rear surface of the vertical board opposite to the pressing portion protrudes rearward to form a trapezoidal guiding block which has two inclined surfaces, and a plane connected between the two inclined surfaces, the two inclined surfaces and the plane are recessed inward to form the adjusting surface, the plurality of the locating slots include two first locating slots and a second locating slot, two opposite ends of the adjusting surface connected with the vertical board open the two first locating slots, the plane connected between the two inclined surfaces opens the second locating slot, a substantial middle of a front surface of the main portion of the adjusting block facing to the guiding block is recessed rearward to form a guiding groove, one side wall of the guiding groove protrudes frontward to form a protruding block facing to the adjusting surface, when the adjusting assembly is in one of the plurality of the adjusting positions, the guiding block is received in the guiding groove, the protruding block is received in one of the two first locating slots corresponding to the protruding block.

7. The trigger with user adjustable sensor position as claimed in claim 5, wherein the adjusting assembly includes a covering portion which is formed by an upper cover board, and four lateral boards surrounded around the upper cover board, the covering portion is covered outside the fastening portion, the sliding portion, the adjusting block and the returning assembly, the upper cover board is disposed on an upper surface of the fastening portion, the four lateral boards surround four lateral surfaces of the fastening portion, respectively, two sides of a surface of the mounting board facing to the pressing portion protrude frontward to form two guiding pillars, the returning assembly includes two compression springs worn around the two guiding pillars, respectively, one end of each compression spring elastically abuts against the mounting board, the other end of each compression spring elastically abuts against one lateral board of the covering portion facing to the two compression springs.

8. The trigger with user adjustable sensor position as claimed in claim 7, wherein two opposite side surfaces of the fastening portion protrude outward to form two assembling portions which open two assembling holes, respectively, the fastening portion is fastened to the outer shell by virtue of the two assembling holes, two lateral boards corresponding to the two assembling portions open two lacking grooves, respectively, the two assembling portions project out of the covering portion from the two lacking grooves.

9. The trigger with user adjustable sensor position as claimed in claim 7, wherein two sides of the one lateral board facing to the returning assembly and abutted by the two compression springs open two guiding holes corresponding to the two guiding pillars.

10. The trigger with user adjustable sensor position as claimed in claim 5, wherein a front of a top of the fastening portion is recessed downward to form a limiting groove communicated with the receiving groove, a top surface of the mounting board protrudes upward to form a limiting block, the limiting block is limited in the limiting groove.

11. The trigger with user adjustable sensor position as claimed in claim 1, wherein a bottom surface of the main portion protrudes downward to form an adjusting button, the adjusting block includes an adjusting cap which has an adjusting board, a middle of a bottom surface of the adjusting board protrudes downward to form an adjusting portion, a top surface of the adjusting board protrudes upward to form a buckling block corresponding to the adjusting portion, a top surface of the buckling block is recessed downward to form a buckling groove, the adjusting board is disposed to a bottom of the main portion, the adjusting portion is disposed to a bottom of the adjusting block, the adjusting button is buckled in the buckling groove, the adjusting portion is exposed out of the outer shell.

12. The trigger with user adjustable sensor position as claimed in claim 1, further comprising a pivoting pillar, the outer shell including an upper cover and a lower cover buckled with each other, an inner bottom wall of the upper cover protruding downward to form a pivoting supporter, two sides of the pivoting supporter opening two pivoting holes transversely penetrating through the two sides of the pivoting supporter, the pressing portion having a touching trough, two sides of a top of the touching trough protruding upward to form two pivoting portions, the two pivoting portions opening two penetrating holes transversely penetrating through the two pivoting portions, the pivoting pillar passing through the two penetrating holes and the two pivoting holes, the torsion spring being pivotally connected to the pivoting pillar, the two pivoting portions being located between the two sides of the pivoting supporter, the torsion spring being located between the two pivoting portions.

13. A game controller, comprising:
   an outer shell;
   a main board disposed in the outer shell;
   a pressing portion pivotally connected to the outer shell and projecting beyond a surface of the outer shell;
   a torsion spring elastically abutting between the pressing portion and the outer shell;
   a triggering portion assembled in the outer shell, the triggering portion being electrically connected with the main board, the triggering portion and the pressing portion being disposed face to face, when an elastic force of the torsion spring is released, the torsion spring elastically abutting against the pressing portion to define a position where the pressing portion is located to be an original position, a position where the pressing portion abuts against the triggering portion to trigger the triggering portion being defined as a triggering position, the pressing portion being capable of swinging between the original position and the triggering position, when the pressing portion is located at the original position, the pressing portion being spaced from the triggering portion to form a key travel between the pressing portion and the triggering portion, the pressing portion being pressed rearward, the pressing portion swinging from the original position to the triggering position, and the pressing portion abutting against the triggering portion to trigger the triggering portion; and
   an adjusting assembly assembled in the outer shell and connected with the triggering portion, the adjusting assembly having a plurality of adjusting positions, when the adjusting assembly is in different adjusting positions, key travels between the pressing portion and the triggering portion being different;

wherein the adjusting assembly has a vertical board extending along an up-down direction, a rear surface of the vertical board opposite to the pressing portion protrudes rearward to form a trapezoidal guiding block which has two inclined surfaces, and a plane connected between the two inclined surfaces, the two inclined surfaces and the plane are recessed inward to form an adjusting surface, two opposite ends of the adjusting surface connected with the vertical board open two first locating slots, the plane connected between the two inclined surfaces opens a second locating slot, the adjusting assembly includes an adjusting block which includes a main portion, a substantial middle of a front surface of the main portion of the adjusting block facing to the guiding block is recessed rearward to form a guiding groove, one side wall of the guiding groove protrudes frontward to form a protruding block facing to the adjusting surface, when the adjusting assembly is in one of the plurality of the adjusting positions, the guiding block is received in the guiding groove, the protruding block is received in one of the two first locating slots and the second locating slot corresponding to the protruding block.

14. A trigger with user adjustable sensor position assembled to an outer shell of a game controller, comprising:
a pressing portion pivotally connected to the outer shell and projecting beyond a surface of the outer shell;
a torsion spring assembled in the outer shell and elastically abutting the pressing portion;
a triggering portion assembled in the outer shell, the triggering portion and the pressing portion being disposed face to face, when an elastic force of the torsion spring is released, the torsion spring elastically abutting against the pressing portion to define a position where the pressing portion is located to be an original position, a position where the pressing portion abuts against the triggering portion to trigger the triggering portion being defined as a triggering position, the pressing portion being capable of swinging between the original position and the triggering position, when the pressing portion is located at the original position, the pressing portion being spaced from the triggering portion to form a key travel between the pressing portion and the triggering portion, the pressing portion being pressed rearward, the pressing portion swinging from the original position to the triggering position, and the pressing portion abutting against the triggering portion to trigger the triggering portion; and
an adjusting assembly assembled in the outer shell and connected with the triggering portion, the adjusting assembly including a sliding portion, and an adjusting block which includes a main portion, a rear surface of the sliding portion opposite to the pressing portion having an adjusting surface, the main portion being disposed behind the adjusting surface, a front surface of the main portion protruding frontward to form a protruding block, the adjusting surface defining a plurality of spaced locating slots corresponding to a plurality of adjusting positions, the main portion being slidably assembled with the sliding portion and being capable of transversely sliding to make the sliding portion slide frontward and rearward with respect to the pressing portion, the protruding block being alternately received in the plurality of the locating slots to make the adjusting assembly be in different adjusting positions, when the adjusting assembly is in the different adjusting positions, key travels between the pressing portion and the triggering portion being different.

15. The trigger with user adjustable sensor position as claimed in claim 14, wherein the sliding portion has a vertical board extending along an up-down direction, a rear surface of the vertical board opposite to the pressing portion protrudes rearward to form a trapezoidal guiding block which has two inclined surfaces, and a plane connected between the two inclined surfaces, the two inclined surfaces and the plane are recessed inward to form the adjusting surface, the plurality of the locating slots include two first locating slots and a second locating slot, two opposite ends of the adjusting surface connected with the vertical board open the two first locating slots, the plane connected between the two inclined surfaces opens the second locating slot, a substantial middle of the front surface of the main portion of the adjusting block facing to the guiding block is recessed rearward to form a guiding groove, one side wall of the guiding groove protrudes frontward to form the protruding block facing to the adjusting surface, when the adjusting assembly is in one of the plurality of the adjusting positions, the guiding block is received in the guiding groove, the protruding block is received in one of the plurality of the locating slots corresponding to the protruding block.

\* \* \* \* \*